United States Patent [19]

Iwami et al.

[11] 3,870,551

[45] Mar. 11, 1975

[54] METHOD OF TREATING GLASS FIBERS USING ULTRASONIC VIBRATION

[75] Inventors: Ichiro Iwami; Tsutomu Matsunaga; Ken Yoneyama, all of Tokyo, Japan

[73] Assignee: Bridgestone Tire Company Limited, Tokyo, Japan

[22] Filed: Aug. 15, 1972

[21] Appl. No.: 280,803

Related U.S. Application Data

[63] Continuation-in-part of Ser. No. 837,730, June 30, 1969, abandoned.

[30] Foreign Application Priority Data

July 8, 1968 Japan................................ 43-47174

[52] U.S. Cl.................... 117/115, 117/62, 117/72, 117/126 GB, 117/126 GS, 117/DIG. 8
[51] Int. Cl........ B01j 1/12, C03c 25/02, B44d 1/44
[58] Field of Search.......... 117/DIG. 8, 62, 126 GB, 117/126 GS, 115

[56] References Cited
UNITED STATES PATENTS 3,098,370  7/1963  Poole et al.......................... 117/115
3,413,186  11/1968  Marzocchi....................... 117/72 X
3,506,476  4/1970  Marzocchi............................ 117/72
3,508,950  4/1970  Marzocchi............................ 117/72

Primary Examiner—William D. Martin
Assistant Examiner—William H. Schmidt
Attorney, Agent, or Firm—Stevens, Davis, Miller & Mosher

[57] ABSTRACT

Continuous glass fibers having high resistance against folding and friction and high adhesivity to rubber are produced by immersing said continuous glass fibers in an RFL resin composition and at the same time applying an ultrasonic wave having a frequency of 100 to 1000 Kc/s uninterruptedly to the continuous glass fibers while passing through a bath of the resin composition. The ultrasonic waves may also be applied after the continuous glass fibers have passed through the bath.

5 Claims, 7 Drawing Figures

FIG_1

A METHOD OF TREATING GLASS FIBERS USING ULTRASONIC VIBRATION

This application is a Continuation-in-part of our co-pending application Ser. No. 837,730, filed June 30, 1969 and now abandoned.

The present invention relates to a method of treating continuous glass fibers continuously, in which a glass strand bundle is immersed in a resin solution and at the same time the resin solution is subjected to ultrasonic wave, whereby air present between glass strands is removed by the ultrasonic energy, and the resin solution is penetrated between strands or filaments fully.

Glass fibers have many characteristics, for example, a high strength and an excellent stability against elongation as a reinforcing material of rubber articles, such as tire and belt, and for the utilization, various investigations have been made. However, since glass fibers are weak against folding and friction, and are apt to break, they have not been used in practice.

The inventors have found that when a glass strand bundle, that is, a glass cord is suffered from fatigue due to dynamic folding and friction, the resin solution not only acts as a bonding agent but also acts a very important function for protecting the glass filaments from the folding and friction.

An object of the present invention is to provide an improved method of treating glass fibers for obtaining an excellent reinforcing material suitable for rubber articles, such as, tire and belt, by which each glass fiber is completely coated with a resin solution and the glass fibers are separated from each other.

The inventors have made various investigations based on the idea that the reason why glass fibers are easily broken by friction is due to mutual rubbing between filaments, and found that the breakage of glass fibers resulting from the fatigue due to folding and friction can be considerably decreased by completely separating glass strands or glass filaments by means of a resin solution or a coating agent into individual glass strands or individual glass filaments. That is, the object of the present invention can be attained by forcedly removing air present between the glass filaments and simultaneously forcedly penetrating the resin solution or coating agent between the glass filaments by means of ultrasonic energy in order to separate and protect filaments completely.

The glass fibers to be used in the present invention include a non-twisted or a substantially non-twisted glass strand composed of filaments having a diameter of 3 – 15 $\mu$, or a glass strand bundle composed of the above-mentioned glass strands.

The resin solution (or coating agent) to be applied in the present invention includes
1. rubber latexes and resin latexes, such as, natural rubber latex, synthetic rubber latex (styrene-butadiene rubber latex, chloroprene rubber latex, polyisoprene rubber latex, etc.) and synthetic resin latex (acrylate latex, styrene-butadiene resin latex, etc.), and mixtures thereof,
2. resins, such as, phenol-formaldehyde resin, urea-formaldehyde resin, vinyl acetate resin, polyvinyl alcohol resin and mixtures thereof,
3. mixtures of the latexes (1) and the resins (2).

Any of these resin solutions may be effective for the purpose of the present invention. The solid content of the resin solution to be used in the invention is 5 – 40% by weight, preferably, 15 – 25% by weight. When the solid content is less than 5% by weight, the concentration is too dilute to coat satisfactorily uniformly. While, when the solid content is more than 40% by weight, the viscosity of the resin solution is too high, and therefore the coating cannot be effected evenly and strands are broken, and it is difficult to treat continuous glass fibers.

An embodiment of composition of the resin solution of a phenol-formaldehyde-rubber latex mixture described in the above item 3 used in the invention is shown.

| | Part by weight |
|---|---|
| Resorcin | 2.03 |
| Formalin (37%) | 2.63 |
| Caustic soda (10%) | 2.00 |
| Styrene/butadiene/vinyl-pyridine terpolymer latex (41%) | 9.77 |
| Styrene/butadiene copolymer rubber latex (39%) | 10.25 |
| Natural rubber latex (60%) | 13.35 |
| Water | 59.97 |
| total: | 100.00 |
| (solid content: 20%) | |

For a better understanding of the invention, reference is taken to the accompanying drawings, wherein.

Figure 1:
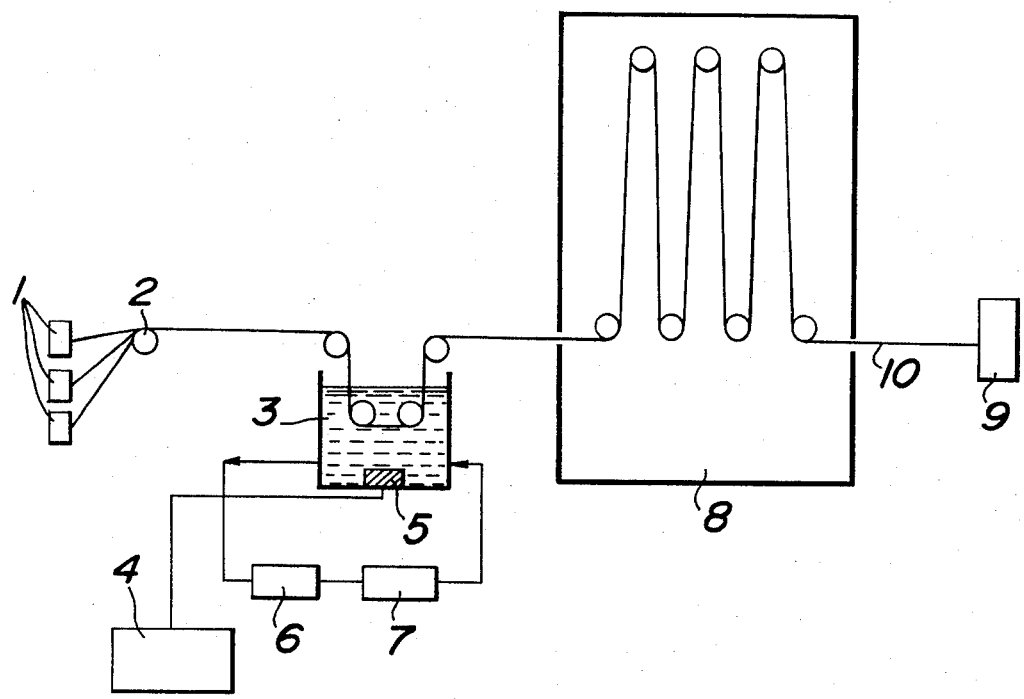
FIG. 1 is a diagrammatic view of an apparatus for carrying out the method of the present invention.

Referring to FIG. 1, any desired number of strands 1 (in the present invention, 10 strands are used) are arranged along a guide roller 2 into a strand bundle and then fed into a tank 3. The strand bundle is immersed in a resin solution and at the same time exposed to ultrasonic waves in the tank 3. The tank 3 is always kept at a temperature of 20 – 80°C. Because, when the temperature is lower than 20°C or higher than 80°C, the latex or resin becomes considerably unstable. Moreover, when a high frequency oscillator 4, such as an ultrasonic oscillator, provided with a vibrator 5 is used for a long period of time at a temperature of higher than 80°C, the operation of the vibrator 5 lowers gradually and a proper oscillation cannot be effected and finally the vibrator 5 is damaged. The resin solution is circulated through a pump 6 and a cooler 7 into the tank 3, thereby the resin solution is maintained at the above-mentioned temperature. It is advantageous in order to attain the object of the present invention that the ultrasonic energy is given to the strand bundle when the bundle passes through the tank 3. The longer the immersing time of the strand bundle in the resin solution in the tank 3, the more completely are effected the coating and the penetration of the resin solution between the strands 1. However, a shorter treating time is required in view of commercial point. In the present invention, an effective treatment can be carried out in a very short time of 0.5 – 10 second, because the strands 1 are non-twisted and merely arranged into a strand bundle in the present invention. It is possible to apply ultrasonic waves to the bundle before the strand bundle enters a drier 8 after passed through the tank 3.

Figure 6:
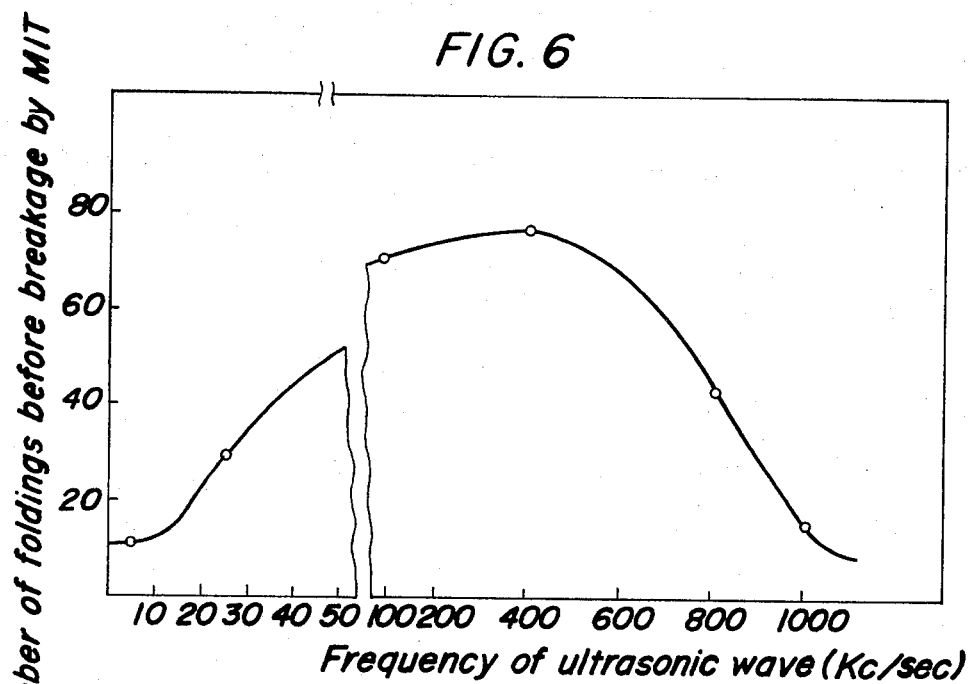
FIG. 6 is a graph showing a relation of number of foldings before breakage to frequency of ultrasonic wave.

In the present invention, in view of the improvement of resistance against folding and friction, the frequency of ultrasonic waves is preferred to be 10 – 1,000 Kc/sec as seen from FIG. 6 but the more preferred range is 100 – 600 Kc/sec. Furthermore, in view of the improvement of adhesivity to rubber, the frequency of ultrasonic waves is preferred to be 100 – 1,000 Kc/sec as seen from FIG. 7.

In view of both the resistance against folding and friction and the adhesivity, the excellent results can be obtained within the range of 100 – 1,000 Kc/sec.

When ultrasonic waves having a frequency of more than 1 Mc/s are used, the ultrasonic waves are absorbed in the resin solution and the stability of the resin solution decreases. Therefore, such ultrasonic waves are not suitable. Moreover, in such a high frequency range, ultrasonic oscillations having a commercially satisfactory power cannot be obtained, and an expensive apparatus will be necessary.

The strand bundle, after passed through the tank 3, is fed into the drier 8 and treated therein at a given temperature of 150° – 250°C and for a given time of 30 – 180 seconds and the temperature and the time are determined depending upon the take-up velocity controlled by a take-up roller 9 and the passage length in the drier 8. The strand bundle come out from the drier 8 forms a non-twisted cord 10 coated with the resin, which is taken up on the take-up roller 9.

The invention will be explained in detail with reference to the following examples.

Example 1

Glass fiber strands each composed of 2,000 monofilaments were arranged into a bundle and the strand bundle was passed through the above described resorcin-formalin-latex solution at 25 – 35°C for 5 seconds, which was exposed to ultrasonic waves under a tensionless state. The frequency was 25 Kc/s.

Figure 2:
FIG. 2 is a photomicrograph of a glass fiber treated with the method of the present invention.
Figure 3:
FIG. 3 is a photomicrograph of a glass fiber only immersed in a resin solution.

The bundle come out from the tank 3 was immediately passed through the drier 8. The bundle was dried in the drier at 200°C for 45 seconds, and then taken up on a take-up roller 9 at a constant velocity. FIG. 2 shows an enlarged view of the filament exposed to the ultrasonic waves in this Example 1. FIG. 3 shows that of a filament not exposed to the ultrasonic waves as a comparison. It is clear from FIG. 3 that the penetration and adhesion of the resin solution are incomplete.

Example 2

Figure 4:
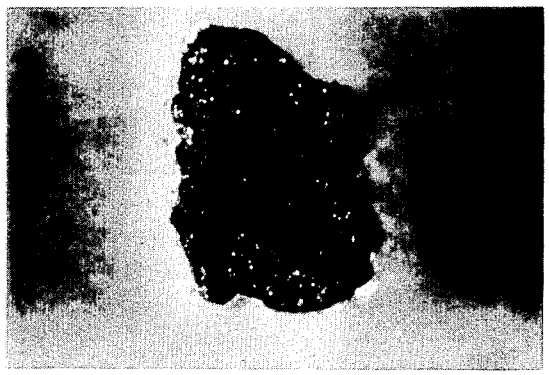
FIG. 4 is a photomicrograph of the cross-section of a glass strand bundle treated with the method of the present invention.
Figure 5:
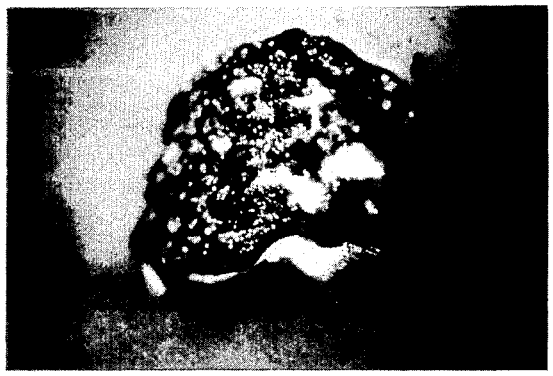
FIG. 5 is a photomicrograph of the cross-section of a glass strand bundle only immersed in a resin solution.

The treatment described in Example 1 was repeated, except that the frequency of ultrasonic waves used was 400 Kc/s. FIG. 4 shows an enlarged cross-sectional view of the strand bundle exposed to the ultrasonic waves in this Example 2. FIG. 5 shows that of a strand bundle not exposed to the ultrasonic waves. It can be seen from FIGS. 4 and 5 that the penetration of the resin solution is improved and voids (trapped air) formed in the inner portion of the strand bundle are removed more effectively by the ultrasonic waves.

Example 3

The treatment described in Example 1 was repeated, except that the frequency of ultrasonic waves used was 5 Kc/s, 100 Kc/s, 800 Kc/s and 1,000 Kc/s.

The strand bundles exposed to ultrasonic waves in Examples 1, 2 and 3 and a strand bundle which was merely immersed in the resin solution without being exposed to ultrasonic waves were examined with respect to the folding endurance by means of a MIT type folding tester.

This tester is originally used for measuring folding endurances of paper, film and the like. The inventors applied this tester to the strand bundle of this invention.

With an upper clamp remodeled for testing the strand bundle and settled previously the swinging angle to 90° was hung a test piece and then, the test piece was clamped with a lower clamp at a length of 100 mm of the test piece and a load of 0.5 Kg was applied to the lower clamp. After the above-mentioned preparation was completed, the test was started, and the folding was continued until the test piece was broken, and the number of folding until the breakage was counted to obtain a result as shown in the following Table 1.

Table 1

| | Merely immersed | Frequency Kc/s | | | | |
| --- | --- | --- | --- | --- | --- | --- |
| | | 5 | 25 | 100 | 400 | 800 | 1,000 |
| Number of folding break- age by MIT | 11 | 10 | 30 | 70 | 76 | 43 | 15 |

The results obtained by varying the frequency of ultrasonic waves are shown in FIG. 6.

As seen from FIG. 6, when the frequency of ultrasonic wave is lower than 10 Kc/s, the number of folding before breakage is substantially the same as that in the case when ultrasonic waves are not applied and ultrasonic waves having a frequency of lower than 10 Kc/s are not effective for the improvement of the resistance against folding and friction. While, ultrasonic waves having a frequency within the range of 10 – 1,000 Kc/s are effective for said resistance, but the range of 100 – 600 Kc/s shows a noticeable effect for said resistance. However, ultrasonic waves having a frequency of higher than 1,000 Kc/s are not effective for said resistance.

Example 4

A relation of the adhesivity between rubber and a glass fiber strand bundle to the frequency of ultrasonic wave was determined as follows.

The treatment described in Example 1 was repeated by varying the frequency of ultrasonic waves except that the immersing time in the resorcin-formalin-latex solution was 10 seconds.

The adhesivity between a glass fiber strand bundle and rubber was determined in the following manner.

A large number of the thus treated glass fiber strand bundles were arranged in parallel at equal interval in a particular mold and fixed so that the bundles did not move, and then the bundles were embedded with unvulcanized rubber as shown in the followings, which was then vulcanized. The mass was left to stand and cooled completely. Then the adhesivity was determined by load-cell type peeling tester at a peeling rate of 5 cm/min. Namely, the bundles were alternately dug out at one end, and three of the dug out ends were fixed to an upper clamp of said tester and the substrate rubber was fixed to a lower clamp of the tester, and the bundles were peeled off from the rubber. At the beginning of the peeling test the peeling angle approached to about 90°. The test was made by always keeping the peeling angle at 90° and the stress per one cord was calculated and used as the adhesivity.

|  | Part by weight |
|---|---|
| Natural rubber | 100 |
| Carbon black | 50.0 |
| Zinc oxide | 5.0 |
| Stearic acid | 4.0 |
| Phenyl-β-naphthylamine | 1.0 |
| Sulfur | 3.0 |
| N-cyclohexylbenzothiazyl sulfonamide | 0.5 |
| Naphtenic oil | 10.0 |

Figure 7:
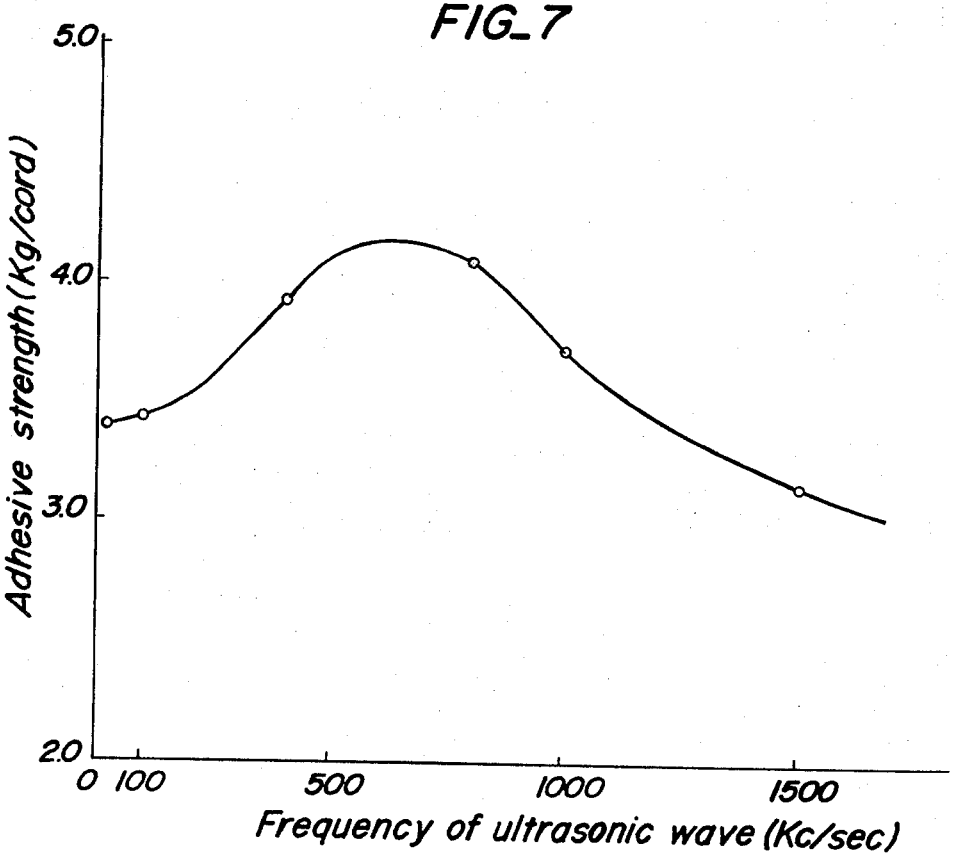
FIG. 7 is a graph showing a relation of adhesivity strength between rubber and a glass fiber strand bundle to frequency of ultrasonic wave.

The results thus obtained are shown in FIG. 7.

As seen from FIG. 7, when the frequency is higher than 1,000 Kc/s, the adhesivity lowers considerably and is inferior to that in the case when ultrasonic waves are not applied. This is probably due to the fact that ultraonic waves having a frequency of higher than 1,000 Kc/s make the resin unstable to be used as an adhesive or cause peeling of a primary treating agent, for example, aminosilane, applied to the glass fibers due to the cavitation phenomenon, whereby the adhesivity between the glass fiber strand and rubber is decreased.

As already mentioned, it can be seen that the improvement of adhesivity to rubber can be attained by the frequency of ultrasonic wave of 100 – 1,000 Kc/s.

What is claimed is:

1. A method for improving the resistance of a bundle of glass fibers against folding and friction and for improving the adhesivity of a bundle of glass fibers with a rubber by treating a bundle of glass fibers with a resorcin-formaldehyde-rubber latex composition, which comprises;

passing said bundle through a bath of said composition which has a solids content of 5 – 40% by weight and is kept at a temperature of 20 – 80°C, applying an ultrasonic wave having a frequency of 100 – 600 Kc/s uninterruptedly to said bath thereby to accelerate the penetration of said composition between fibers, and drying the composition treated fibers.

2. The method as claimed in claim 1, wherein said bundle of glass fibers is immersed in said composition for 0.5 – 10 seconds.

3. The method as claimed in claim 1, wherein said bundle of glass fibers penetrated by said composition is dried at 150° – 250°C for 30 – 180 seconds.

4. The method as claimed in claim 1, wherein the solid content is 15 – 25% by weight.

5. The method as claimed in claim 1, wherein the glass fibers are substantially non-twisted.

* * * * *